United States Patent [19]

Matsuda et al.

[11] 4,174,339
[45] Nov. 13, 1979

[54] ANTI-FOULING PAINT COMPOSITION

[75] Inventors: Sumio Matsuda, Ibaraki; Hajime Kudara, Shiga, both of Japan

[73] Assignee: Chugoku Marine Paints Ltd., Hiroshima, Japan

[21] Appl. No.: 947,860

[22] Filed: Oct. 2, 1978

Related U.S. Application Data

[63] Continuation-in-part of Ser. No. 855,231, Nov. 18, 1977, abandoned.

[51] Int. Cl.$^2$ .............................................. C08K 3/00
[52] U.S. Cl. .............................. 260/40 R; 106/15.05; 260/42.52
[58] Field of Search ............... 260/40 R, 42.52, 899, 260/901; 526/16; 106/15 AF

[56] References Cited

U.S. PATENT DOCUMENTS

| | | | |
|---|---|---|---|
| 3,167,437 | 1/1965 | Leebrick | 167/38.6 |
| 3,979,354 | 9/1976 | Dyckman et al. | 260/37 EP |
| 4,064,338 | 12/1977 | Russell | 526/230 |

FOREIGN PATENT DOCUMENTS 40-21426  9/1965  Japan.
1124297  8/1968  United Kingdom.

*Primary Examiner*—Lewis T. Jacobs
*Attorney, Agent, or Firm*—Armstrong, Nikaido, Marmelstein & Kubovcik

[57] ABSTRACT

Provided is an anti-fouling paint composition for preventing, for an extended period of time, fouling of submersed or submerged objects or marine structures. The paint composition comprises as an anti-fouling agent a reaction product prepared by the esterification of a copolymer (a) comprised of units derived from at least one trialkyl-tin carboxylate of the formula:

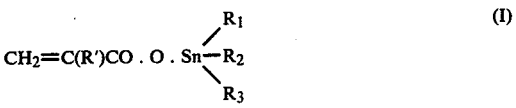

wherein R′ is H or CH$_3$, and R$_1$, R$_2$ and R$_3$ are the same or different and selected from (C 1 to 8) alkyl groups and a phenyl group, and units derived from at least one carboxylic acid of the formula:

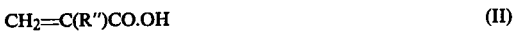

wherein R″ is H or CH$_3$, with a copolymer (b) comprised of units derived from at least one phenoxyaceticalkyl carboxylate of the formula:

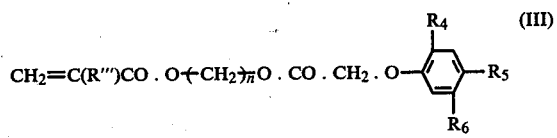

wherein R‴ is H or CH$_3$, n is an integer of 2 to 4, R$_4$ is Cl or (C 1 to 4) alkyl group, R$_5$ is Cl or Br and R$_6$ is H, Cl or Br, and units derived from at least one hydroxyalkyl carboxylate of the formula:

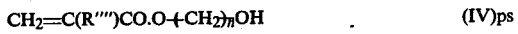

wherein R″″ is hydrogen H or CH$_3$ and n is an integer of 2 to 4.

7 Claims, No Drawings

ANTI-FOULING PAINT COMPOSITION

This application is a continuation-in-part of copending application Ser. No. 855,231, filed Nov. 18, 1977, now abandoned.

This invention relates to anti-fouling paint compositions for preventing for an extended period of time fouling of submersed or submerged objects or marine structures while also minimizing pollution.

Recently various anti-fouling paints have been developed which prevent for an extended period of time fouling of submerged structures. Most of these anti-fouling paints are characterized as comprising an organo-tin polymer.

For example, British Pat. No. 1,124,297 discloses an anti-fouling paint comprising a polymer vehicle having organo-tin radicals chemically combined therein, which radicals are of the formula: $SnR^1R^2R^3$ where $R^1$, $R^2$ and $R^3$ are n-propyl, isopropyl, n-butyl, n-amyl or phenyl. Typical polymer vehicles used are polymers of a salt of an $\alpha$, $\beta$-unsaturated acid and the organo-tin radical, such as poly(tri-n-butyltin) methacrylate, and copolymers of such a salt and a copolymerizable monomer, such as a tri-n-butyltin methacrylate/methyl methacrylate copolymer. U.S. Pat. No. 3,979,354 discloses an anti-fouling composition comprising a 1,2-epoxy polymer cross-linked with a curing agent having a carboxylic acid group chemically bonded to an organo-tin compound, such as a copolymer of an organo-tin methacrylate and glycidyl methacrylate. Furthermore, Japanese Patent Publication No. 21426/1965 discloses an anti-fouling composition comprising a polymer derived from an unsaturated organo-tin monomer of the formula: $(R)_3SnO-CO\ CR'=CHR''$ where R is propyl, butyl, amyl or hexyl, and R' and R'' are hydrogen, lower alkyl or phenyl.

The polymers of unsaturated ogano-tin-containing monomers disclosed in the prior art references listed in the previous paragraph have an advantage over conventional low molecular weight anti-fouling agents in that the polymers remain effective for a long time. However, these anti-fouling polymers are less effective for preventing the fouling caused by slime and seaweed such as sea lettuce than for preventing the fouling caused by shellfish. Furthermore, most of the anti-fouling polymers are poor in shelf life stability.

It is an object of the present invention to provide an anti-fouling paint composition, the efficasy and life of which for exceed those of comparable paints having incorporated therein a polymer of an unsaturated organo-tin-containing monomer. Furthermore, the anti-fouling paint composition of the present invention is effective for preventing the fouling caused by slime and seaweed, as well as that caused by shellfish, and it exhibits improved shelf life stability.

Provided in accordance with the present invention is an anti-fouling paint composition comprising 20% to 60% by weight of one pigment and 20% to 60% by weight of a reaction product which is prepared by the esterification of a copolymer (a), defined below, with a copolymer (b) defined below and which has an esterification degree of at least 60%;

the copolymer (a) being comprised of 60% to 90% by weight, based on the weight of the copolymer (a), of units derived from at least one trialkyl-tin carboxylate of the formula;

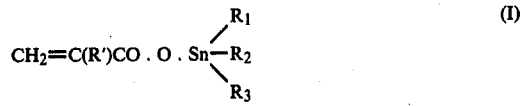

wherein R' is hydrogen or a methyl group, and $R_1$, $R_2$ and $R_3$ are the same or different and selected from alkyl groups having 1 to 8 carbon atoms and a phenyl group, and 10% to 40% by weight, based on the weight of the copolymer (a), of units derived from at least one carboxylic acid of the formula:

$$CH_2=C(R'')CO.OH \qquad (II)$$

wherein R'' is hydrogen or a methyl group;

the copolymer (b) being comprised of 30% to 80% by weight, based on the weight of the copolymer (b), of units derived from at least one phenoxyaceticalkyl carboxylate of the formula:

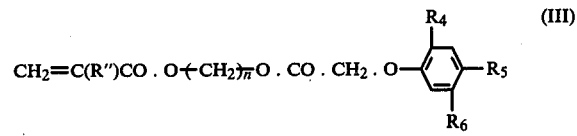

wherein R''' is hydrogen or a methyl group, n is an integer of 2 to 4, $R_4$ is chlorine or an alkyl group having 1 to 4 carbon atoms, $R_5$ is chlorine or bromine and $R_6$ is hydrogen, chlorine or bromine, and 20% to 70% by weight, based on the weight of the copolymer (b), of units derived from at least one hydroxyalkyl carboxylate of the formula:

$$CH_2=C(R'''')CO.O-(CH_2)_nOH \qquad (IV)$$

wherein R'''' is hydrogen or a methyl group, and n is an integer of 2 to 4; and the ratio by weight of the copolymer (a) to the copolymer (b) being 40 to 95:5 to 60.

The anti-fouling paint composition of the invention is characterized by containing the toxic reaction product which would be mainly comprised of a copolymer possessing trialkyl-tin carboxylate radicals and substituted phenoxy-aceticalkyl carboxylate radicals. The toxic reaction product is prepared by the esterification of a copolymer (a) having trialkyl-tin carboxylate radicals and carboxyl radicals with a copolymer (b) having substituted phenoxy-aceticalkyl carboxylate radicals and hydroxyalkyl carboxylate radicals. It is presumed that at least part of the carboxyl radicals in the copolymer (a) is reacted with at least part of the hydroxyl groups of the hydroxyalkyl carboxylate radicals in the copolymer (b) thereby to form the above-mentioned copolymer possessing both trialkyl-tin carboxylate radicals and substituted phenoxy-aceticalkyl carboxylate radicals.

The copolymer (a) used is prepared by copolymerizing a monomer of the formula (I) with a monomer of the formula (II). The monomer of the formula (I) includes, for example, trimethyl-tin methacrylate, triethyl-tin methacrylate, tributyl-tin methacrylate, triphenyl-tin methacrylate, triethyl-tin acrylate, tributyl-tin acrylate and triphenyl-tin acrylate. The monomer of the formula (II) includes, for example, acrylic acid and methacrylic acid.

The monomer of the formula (I) may be prepared by, for example, condensing an organo-tin oxide or hydroxide of the formula:

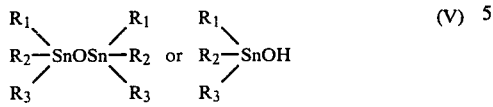  (V)

wherein $R_1$, $R_2$ and $R_3$ are the same as those defined with reference to the formula (I), with an unsaturated carboxylic acid of the formula:

$$CH_2=C(R')CO.OH \qquad (VI)$$

This condensation process is described in detail in U.S. Pat. No. 3,016,369.

In the polymerization procedure for the preparation of the copolymer (a), a mixture of the organo-tin oxide or hydroxide of the formula (V) and the unsaturated carboxylic acid of the formula (VI) may be used instead of a partial or the whole amount of the monomer of the formula (I).

The copolymerization of the monomer of the formula (I) and the monomer of the formula (II) may be carried out in known manners and in the presence of a free radical initiator. In general the copolymerization may be carried out in a solvent at a temperature of about 20° C. to about 150° C. and for a period of 20 minutes to about 10 hours. The free radical initiator used includes, for example, azobisisobutyronitrile, methyl ethyl ketone peroxide or benzoyl peroxide. The solvent used includes, for example, an aromatic hydrocarbon such as xylene or toluene. The respective monomers of the formula (I) and (II) may be used alone or in combination. The amounts of the monomer of the formula (I) and the monomer of the formula (II) are preferably 60% to 90% by weight and 10% to 40% by weight, respectively, based on the total weight of the monomers for the copolymer (a).

The copolymer (a) may comprise, in addition to the units derived from the monomers of the formulae (I) and (II), a minor proportion of units derived from at least one other copolymerizable monoethylenically unsaturated monomer. Such copolymerizable monomers include, for example, styrene, α-methylstyrene, vinyl benzoate, vinyl chloride, acrylonitrile, vinyl acetate, ethylene, propylene, methyl acrylate, ethyl acrylate, methyl methacrylate and ethyl methacrylate. The amounts of these copolymerizable monomers are preferably below 20% by weight of based on the total weight of the monomers for the copolymer (a).

The copolymer (a) may be prepared by, instead of copolymerizing the monomer of the formula (I) with the monomer of the formula (II), first polymerizing the monomer or monomers of the formula (II) and, then, reacting the so produced polymer with the organo-tin oxide or hydroxide of the formula (V). The polymerization of the monomer or monomers of the formula (II) may be carried out under conditions similar to those employed in the copolymerization of the monomer (I) and the monomer (II).

The copolymer (b) used is prepared by copolymerizing a monomer of the formula (III) with a monomer of the formula (IV). The monomer of the formula (III) includes, for example, 2-(2,4-dichlorophenoxyacetic-)ethyl acrylate, 2-(2-methyl-4-chlorophenoxyacetic-)ethyl acrylate and 3-(2,4,5-trichlorophenoxyacetic)-propyl acrylate. The monomer of formula (IV) includes, for example, 2-hydroxyethyl methacrylate, 2-hydroxyethyl acrylate and 2-hydroxypropyl acrylate.

The monomer of formula (III) may be prepared by the esterification of a compound of the formula:

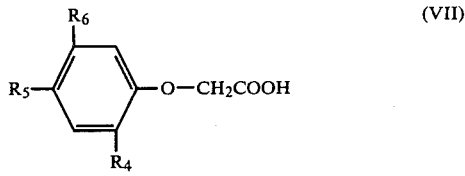  (VII)

wherein $R_4$, $R_5$ and $R_6$ are the same as those defined with reference to the formula (III), with a compound of the formula:

$$CH_2=C(R''')CO.O\text{-}(CH_2)_n OH \qquad (VIII)$$

wherein $R'''$ and n are the same as those defined with reference to the formula (III).

In the polymerization procedure for the preparation of the copolymer (b), a mixture of the compound of the formula (VII) and the compound of the formula (VIII) may be used instead of a partial or the whole amount of the monomer of the formula (III).

The copolymerization of the monomer of formula (III) and the monomer of the formula (IV) may be carried out in manners similar to those described in the copolymerization of the monomer of the formula (I) and the monomer of the formula (II). The respective monomers of the formulae (III) and (IV) may be used alone or in combination. The amounts of the monomer of the formula (III) and the monomer of the formula (IV) are preferably 30% to 80% by weight and 20% to 70% by weight, respectively, based on the total weight of the monomers for the copolymer (b).

The copolymer (b) may also comprise, in addition to the units derived from the monomers of the formulae (III) and (IV), a minor proportion of units derived from at least one other copolymerizable monoethylenically unsaturated monomer. Such a copolymerizable monomer may selected from those monomers which are hereinbefore listed as the copolymerizable monomers used for the preparation of the copolymer (a). The amount of the copolymerizable monomer is preferably below 20% by weight based on the total weight of the monomers for the copolymer (b).

The copolymer (b) may be prepared by, instead of copolymerizing the monomer of the formula (III) with the monomer of the formula (IV), first polymerizing the monomer or monomers of the formula (IV) and, then, treating the so produced polymer with the compound of the formula (VII). The polymerization of the monomer or monomers of the formula (IV) may be carried out under conditions similar to those employed in the copolymerization of the monomer (III) and the monomer (IV).

The esterification of the copolymer (a) with the copolymer (b) may be carried out in known manners. The ratio by weight of the copolymer (a) to the copolymer (b) may usually be varied within the range of from 40/60 to 95/5. The optimum ratio is approximately 80/20 by weight. If desired, the esterification may be carried out in the presence of a catalyst such as sulfuric acid, hydrochloric acid, p-toluene sulfonic acid, zinc chloride, tin chloride, trifluoroboron, silicic anhydride or an ion-exchange resin. Of these, p-toluene sulfonic acid is preferable.

The degree of esterification should be at least 60%. When the degree of esterification is too low, the esterified product is liable to be undesirably precipitated or changed in color during storage. The degree of esterification can be, at maximum, approximately 100% at the highest. A preferable degree of esterification is in the range of from 70% to 90%. The degree of esterification can be determined by measuring the quantity of water produced by esterification. When the carboxyl groups of the copolymer (a) and the hydroxyl groups of the copolymer (b) are not equimolar, the degree of esterification is calculated based upon either the carboxyl group or the hydroxyl group, depending on which of the two groups has a smaller number of moles.

The copolymers (a) and (b) preferably possess average molecular weights of approximately 2,500 to approximately 30,000. The reaction product of the copolymers (a) and (b) preferably possesses an average molecular weight of approximately 4,000 to approximately 45,000. When the molecular weight of the reaction product is too large, the anti-fouling paint obtained becomes excessively viscous and is difficult to coat onto marine structures. When the molecular weight of the reaction product is too small, the anti-fouling paint obtained is also difficult to brush coat onto marine structures and, further, coatings of the anti-fouling paint obtained are not satisfactory because of their poor mechanical strengths.

By the term "molecular weight" used herein is meant the number average molecular weight which is determined according to an osmotic pressure measuring method by using a high speed membrane osmometer such as that of type 502 supplied by Hewlett-Packard Co.

The esterification product of the copolymers (a) and (b) should preferably occupy 20% to 60% by weight of the total weight of the anti-fouling paint composition.

The anti-fouling paint composition comprises, in addition to the reaction product mentioned above, one or more pigments which may be conventionally used in paints for submersed or submerged objects or marine structures. The pigments used include, for example, anti-fouling pigments such as cuprous oxide and cuprous thiocyanate; anti-fouling enhancing pigments such as zinc oxide; coloring pigments such as phthalocyanine Blue; and extender pigments such as silica white, talc, china clay, calcium carbonate and barium sulfate. These pigments may be used either alone or in combination. The amounts of these pigments are preferably in the range of approximately 20% to 60% by weight based on the weight of the paint composition.

If desired, the anti-fouling paint composition may further comprise additives, for example, filler such as talc and an anti-sagging agent. The amounts of these additives may vary depending upon the intended use of the paint composition but are usually in the range of approximately 1% to 60% by weight, based on the weight of the paint composition. The application of the anti-fouling paint composition of the present invention to marine structures may be carried out by a conventional procedure wherein a suitable solvent is used.

The invention will be further illustrated with reference to the following "preparation" examples, wherein preparations of the esterification products of the invention are illustrated, and to the following example, wherein anti-fouling paint compositions are illustrated.

In the examples, % and parts are by weight unless otherwise specified.

EXAMPLES OF THE PREPARATION OF ANTI-FOULING POLYMERS

Preparation 1

A half mole of acrylic acid, 0.3 mole of methyl acrylate and 0.2 mole of butyl acrylate were charged in a reactor together with 4 g of azobisisobutyronitrile and 300 ml of toluene. The content was maintained at a temperature of 70° to 75° C. for approximately three hours, while being stirred, thereby to be copolymerized. When the temperature of the reaction mixture fell to approximately 50° C., 0.2 mole of bis(tributyltin)oxide [$(C_4H_9)_3SnOSn(C_4H_9)_3$] and 2 g of paratoluenesulfonic acid were added to the reaction mixture. The reaction mixture was then maintained at the reflux temperature of toluene until the reaction mixture was completely esterifed. The esterified product was a light yellow liquid (hereinafter referred to as "product A" for brevity).

A half mole of 2-hydroxyethyl acrylate, 0.3 mole of 2,4-dichlorophenoxyacetic acid and 300 ml of toluene were charged in a reactor together with 2 g of paratoluenesulfonic acid. The content was maintained at the reflux temperature of toluene thereby to be completely esterified. 1.5 g of azobisisobutyronitrile were added to the esterified product at a temperature of approximately 50° C. The mixture was maintained at a temperature of 70° to 75° C. for approximately three hours, while being stirred. The product so prepared was a yellow liquid (hereinafter referred to as "product A'" for brevity).

200 ml of toluene and 3 g of paratoluenesulfonic acid were added to a mixture of the above-mentioned product A and product A'. Then, the mixture was maintained at the reflux temperature for approximately three hours. The product was maintained at a reduced pressure to distill off toluene from the reaction product. The product so obtained was yellowish brown and comprised a copolymer having an average molecular weight of approximately 7,500. The degree of esterification was 83%.

Following the above-mentioned procedures, another copolymer was prepared wherein methacrylic acid was used instead of acrylic acid.

PREPARATION 2

One mole of acrylic acid and 0.3 mole of bis(tributyltin)oxide[$(C_4H_9)_3SnOSn(C_4H_9)_3$] were charged in a reactor together with 200 ml of toluene and 2 g of paratoluenesulfonic acid. The content was maintained at the reflux temperature for approximately two hours, while being stirred. One mole of toluene, 0.5 mole of butyl acrylate, 5 g of azobisisobutyronitrile and 100 of toluene were added to the reaction product. Then, the mixture was maintained at a temperature of 70° to 75° C. for approximately three hours. The reaction product so prepared is hereinafter referred to as "product B."

Using 1.0 mole of 2-hydroxyethyl acrylate, 0.5 mole of 2-methyl-4-chlorophenoxyacetic acid and 300 ml of toluene, esterification was carried out in a conventional manner. After 0.3 mole of butyl acrylate was added to the esterified product, polymerization was carried out in a manner similar to that mentioned above in the preparation of product B. The reaction product so prepared is hereinafter referred to as "product B'" for brevity.

Three hundred mls of toluene were added to a mixture of the above-mentioned product B and product B', followed by the esterification by a conventional procedure. The esterified product was light brown and comprised of a copolymer having an average molecular weight of 6,500 to 6,800. The degree of esterification was 80%.

Preparation 3

One mole of acrylic acid, 0.3 mole of butyl acrylate and 0.5 mole of styrene were charged in a reactor together with 300 ml of toluene and 2 g of azobisisobutyronitrile. The content was copolymerized in a manner similar to that set forth in Preparation 1. 0.2 mole of bis(tributyltin)oxide[$(C_4H_9)_3SnOSn(C_4H_9)_3$] and 0.1 mole of bis(tripropyltin)oxide[$C_3H_7)_3SnOSn(C_3H_7)$] were added to the copolymer product, followed by the esterification in a manner similar to that set forth in Preparation 1. The product so prepared is hereinafter referred to as "product C" for brevity.

A mixture of 1 mole of 3-hydroxypropyl acrylate, 0.7 mole of 2,4,5-trichlorophenoxyacetic acid and 300 ml of toluene was treated in a manner similar to that set forth in Preparation 1, thereby to be esterified. After 0.5 mole of octyl acrylate and 200 ml of toluene were added to the esterified product, polymerization was carried out in a manner similar to that mentioned in the preparation of product A' in Preparation 1. The copolymer product so prepared is hereinafter referred to as "product C'" for brevity.

A mixture of the above-mentioned product C and product C' was esterified in a manner similar to that mentioned in Preparation 1 to obtain a yellow liquid. The esterified copolymer product so prepared had an average molecular weight of approximately 8,500 and an esterification degree of 78%.

Preparation 4

One mole of methacrylic acid, 0.5 mole of butyl acrylate and 0.5 mole of styrene were copolymerized in a manner similar to that set forth in the preparation of product A in Preparation 1. 0.6 ml of triphenyltin hydroxide[$(C_6H_5)_3SnOH$] and 300 ml of toluene were added to the copolymer product, followed by the esterification in a manner similar to that set forth in the preparation of product A in Preparation 1. The product so prepared is hereinafter referred to as "product D" for brevity.

Following a procedure set forth in the preparation of product A' in Preparation 1, a mixture of 1 mole of 2-hydroxyethyl acrylate, 0.3 mole of 2,4-dichlorophenoxyacetic acid, 0.3 mole of 2-methyl-4-chlorophenoxyacetic acid, 1.0 mole of styrene and 300 ml of toluene was treated, thereby to be completely esterified, and then, the esterified product was copolymerized at a temperature of 70° to 73° C. The copolymer product so prepared is hereinafter referred to as "product D'."

A mixture of the above-mentioned product D and product D' was esterified in a manner similar to that set forth in Preparation 1. The esterified copolymer product so prepared had an average molecular weight of approximately 5,000 and an esterification degree of 82%.

Examples of the preparation and evaluation of anti-fouling paints.

Following a conventional procedure, anti-fouling paints were prepared according to the receipe shown in Table I, below.

Table I

| Ingredient | Type A (parts) | Type B (parts) |
|---|---|---|
| Anti-fouling polymer | 45 | 28 |
| Cuprous oxide | — | 58 |
| Red iron oxide | 5 | 1 |
| Zinc oxide | 32 | 1 |
| Aluminum stearate | 0.5 | 1.5 |
| Bentone 34* | 1 | 1 |
| Xylene | 16.5 | 9.5 |

*Anti-sagging agent supplied by National Lead.

For comparison purposes, three anti-fouling paints (X, Y and Z) are prepared according to the receipe shown in Table II, below.

TABLE II

| Ingredient | X (parts) | Y (parts) | Z (parts) |
|---|---|---|---|
| Cuprous oxide | 40 | — | — |
| Triphenyltin hydroxide | — | 20 | — |
| Talc | — | 5 | — |
| Rosin | 12 | — | — |
| Vinyl resin | 8 | — | — |
| Acrylic resin | — | 25 | — |
| Methyl isobutyl ketone | 20 | 20 | 10 |
| Xyrene | 20 | 15 | 10 |
| Rutile titanium dioxide | — | 15 | 10 |
| Tributyltin methacrylate/methyl methacrylate copolymer | — | — | 45 |
| Zinc flower | — | — | 25 |

Each anti-fouling paint was brush coated on the entire surface of a soft steel plate having a length of 30 cm, a width of 10 cm and a thickness of 2 mm. The coating thickness was approximately 100 microns. The coated plate was tested for its anti-fouling property by immersing in sea water in natural environment. The proportion in percent of the area, which was covered by living things and slime, to the entire surface of the steel plate is shown in Table III, below.

Table III

| Anti-fouling paint* | Immersion period (months) | | | | | |
|---|---|---|---|---|---|---|
| | 6 | | 12 | | 24 | |
| | living things | slime | living things | slime | living things | slime |
| A1 | 0 | 0 | 0 | 0 | 0 | 0 |
| B1 | 0 | 0 | 0 | 0 | 0 | 0 |
| C1 | 0 | 0 | 0 | 0 | 2 | 2 |
| D1 | 0 | 0 | 0 | 0 | 5 | 0 |
| A2 | 0 | 0 | 0 | 0 | 0 | 0 |
| B2 | 0 | 0 | 0 | 0 | 0 | 0 |
| C2 | 0 | 0 | 0 | 0 | 0 | 5 |
| D2 | 0 | 0 | 0 | 0 | 1 | 0 |
| X | 0 | 5 | 0 | 10 | 30 | 60 |
| Y | 0 | 0 | 0 | 20 | 40 | 60 |
| Z | 0 | 20 | 5 | 40 | 20 | 50 |

*The letters "A" and "B" are the types of paints shown in Table I and numbers next to the letters show the numbers of Examples for the preparation of anti-fouling polymers.
The letters "X", "Y" and "Z" are comparative anti-fouling paints shown in Table II.

What we claim is:

1. An anti-fouling paint composition, which comprises 20% to 60% by weight of at least one pigment and 20% to 60% by weight of a reaction product prepared by the esterification of a copolymer (a), defined below, with a copolymer (b) defined below, said reaction product having an esterification degree of at least 60%;

the copolymer (a) being comprised of 60% to 90% by weight, based on the weight of the copolymer (a), of units derived from at least one trialkyl-tin carboxylate of the formula:

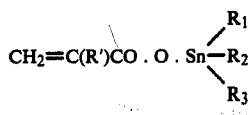 (I)

wherein R' is hydrogen or a methyl group, and $R_1$, $R_2$ and $R_3$ are the same or different and selected from alkyl groups having 1 to 8 carbon atoms and a phenyl group, and 10% to 40% by weight, based on the weight of the copolymer (a), of units derived from at least one carboxylic acid of the formula:

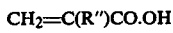 (II)

wherein R" is hydrogen or a methyl group;
the copolymer (b) being comprised of 30% to 80% by weight, based on the weight of the copolymer (b), of units derived from at least one phenoxyaceticalkyl carboxylate of the formula:

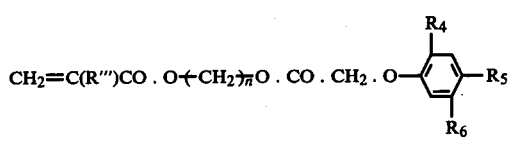 (III)

wherein R''' is hydrogen or a methyl group, n is an integer of 2 to 4, $R_4$ is chlorine or an alkyl group having 1 to 4 carbon atoms, $R_5$ is chlorine or bromine and $R_6$ is hydrogen, chlorine or bromine, and 20% to 70% by weight, based on the weight of the copolymer (b), of units derived from at least one hydroxyalkyl carboxylate of the formula:

 (IV)

wherein R'''' is hydrogen or a methyl group, and n is an integer of 2 to 4; and
the ratio by weight of the copolymer (a) to the copolymer (b) being 40 to 95:5 to 60.

2. An anti-fouling composition as claimed in claim 1 wherein either or both copolymers (a) and (b) further comprise below 20% by weight, based on the weight of the copolymer, of units derived from at least one other copolymerizable monoethylenically unsaturated monomer.

3. An anti-fouling paint composition as claimed in claim 1 wherein said reaction product possesses an average molecular weight of approximately 4,000 to approximately 45,000.

4. An anti-fouling paint composition as claimed in claim 1 wherein the copolymer (a) is prepared by copolymerizing at least one trialkyl-tin carboxylate of the formula:

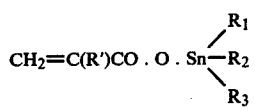 (I)

wherein R' is hydrogen or a methyl group, and $R_1$, $R_2$ and $R_3$ are the same or different and selected from alkyl groups having 1 to 8 carbon atoms and a phenyl group, with at least one monomer of the formula:

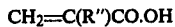 (II)

wherein R" is hydrogen or a methyl group; said copolymerization being carried out in a solvent at a temperature of about 20° C. to about 150° C. in the presence of a free radical initiator.

5. An anti-fouling paint composition as claimed in claim 1 wherein the copolymer (a) is prepared by the steps of:
polymerizing the monomer or monomers of the formula:

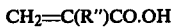 (II)

wherein R" is hydrogen or a methyl group, and then,
reacting the obtained polymer with an organo-tin oxide or hydroxide of the formula:

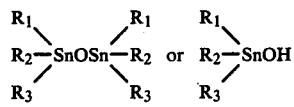 (V)

wherein $R_1$, $R_2$ and $R_3$ are the same as those defined with reference to the formula (I); said polymerization being carried out in a solvent at a temperature of about 20° C. to about 150° C. in the presence of a free radical initiator.

6. An anti-fouling paint composition as claimed in claim 1 wherein the copolymer (b) is prepared by copolymering at least one phenoxyaceticalkyl carboxylate of the formula:

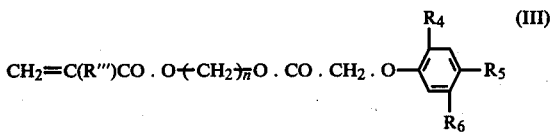 (III)

wherein R''' is hydrogen or a methyl group, n is an integer of 2 to 4, $R_4$ is chlorine or an alkyl group having 1 to 4 carbon atoms, $R_5$ is chlorine or bromine and $R_6$ is hydrogen, chlorine or bromine, with at least one hydroxyalkyl carboxylate of the formula:

 (IV)

wherein R'''' is hydrogen or a methyl group, and n is an integer of 2 to 4; said copolymerization being carried out in a solvent at a temperature of about 20° C. to about 150° C. in the presence of a free radical initiator.

7. An anti-fouling paint composition as claimed in claim 1 wherein the copolymer (b) is prepared by the steps of:
polymerizing the monomer or monomers of the formula:

 (IV)

wherein R'''' is hydrogen or a methyl group and n is an integer of 2 to 4, and then,
reacting the obtained polymer with a compound of the formula:

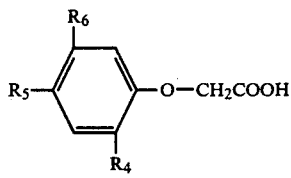

(VII)

wherein $R_4$, $R_5$ and $R_6$ are the same as those defined with reference to the formula (III); said polymerization being carried out in a solvent at a temperature of about 20° C. to about 150° C. in the presence of a free radical initiator.

* * * * *

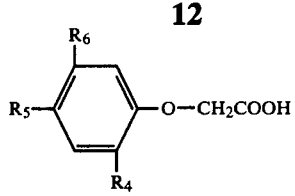

(VII)

wherein $R_4$, $R_5$ and $R_6$ are the same as those defined with reference to the formula (III); said polymerization being carried out in a solvent at a temperature of about 20° C. to about 150° C. in the presence of a free radical initiator.

* * * * *